(12) United States Patent
Baerenklau et al.

(10) Patent No.: US 9,753,221 B2
(45) Date of Patent: Sep. 5, 2017

(54) OPTICAL COUPLER FOR A MULTICORE FIBER

(71) Applicant: LEONI KABEL HOLDING GMBH, Nuremberg (DE)

(72) Inventors: Peggy Baerenklau, Jena (DE); Lothar Brehm, Jena (DE); Maria Kufner, Sonnefeld (DE); Stefan Kufner, Sonnefeld (DE)

(73) Assignee: LEONI Kabel Holding GmbH, Nuremberg (DE)

( * ) Notice: Subject to any disclaimer, the term of this patent is extended or adjusted under 35 U.S.C. 154(b) by 0 days.

(21) Appl. No.: 15/017,862

(22) Filed: Feb. 8, 2016

(65) Prior Publication Data

US 2016/0170144 A1 Jun. 16, 2016

Related U.S. Application Data

(63) Continuation of application No. PCT/EP2014/062430, filed on Jun. 13, 2014.

(30) Foreign Application Priority Data

Aug. 6, 2013 (DE) ........................ 10 2013 013 071

(51) Int. Cl.
*G02B 6/28* (2006.01)
*G02B 6/30* (2006.01)
(Continued)

(52) U.S. Cl.
CPC ....... *G02B 6/2804* (2013.01); *G02B 6/02042* (2013.01); *G02B 6/25* (2013.01);
(Continued)

(58) Field of Classification Search
None
See application file for complete search history.

(56) References Cited

U.S. PATENT DOCUMENTS

| 5,138,687 A | 8/1992 | Horie et al. |
| 5,689,578 A | 11/1997 | Yamauchi et al. |

(Continued)

FOREIGN PATENT DOCUMENTS

| CN | 1967302 A | 5/2007 |
| CN | 202305881 U | 7/2012 |

(Continued)

OTHER PUBLICATIONS

Machine translation of JP 2011-237573 A, Shimakawa, Nov. 2011.*

*Primary Examiner* — Hemang Sanghavi
(74) *Attorney, Agent, or Firm* — Laurence A. Greenberg; Werner H. Stemer; Ralph E. Locher

(57) ABSTRACT

An optical coupler is used to optically couple a multicore fiber with multiple optical cores to multiple individual fibers and contains a support in which the multicore fiber is embedded, the cores exiting at a polished end surface. The cores are assembled into groups along lines, and each group is oriented along a line. Waveguides of multiple planar support elements, the waveguides being introduced into the surface of the support elements, are connected to the end surface, each group of cores being coupled into a support element. In this manner, the multicore fiber can be coupled to individual fibers using planar waveguide technology.

11 Claims, 3 Drawing Sheets

(51) Int. Cl.
*G02B 6/36* (2006.01)
*G02B 6/02* (2006.01)
*G02B 6/25* (2006.01)
G02B 6/38 (2006.01)
G02B 6/12 (2006.01)

(52) U.S. Cl.
CPC ............ *G02B 6/30* (2013.01); *G02B 6/3636* (2013.01); *G02B 6/3885* (2013.01); *G02B 2006/12147* (2013.01)

(56) References Cited

U.S. PATENT DOCUMENTS

| | | |
|---|---|---|
| 6,049,646 A | 4/2000 | Boscher |
| 8,270,784 B2 * | 9/2012 | Thomson ............... G02B 6/125 385/135 |
| 8,320,724 B2 * | 11/2012 | Sasaoka ............. G02B 6/02042 385/121 |
| 9,069,134 B2 | 6/2015 | Ross et al. |
| 9,568,688 B2 | 2/2017 | Sasaoka |
| 2011/0176776 A1 | 7/2011 | Imamura |
| 2012/0328244 A1 | 12/2012 | Sasaki et al. |
| 2013/0051729 A1 | 2/2013 | Chen et al. |

FOREIGN PATENT DOCUMENTS

| | | | | |
|---|---|---|---|---|
| JP | 2011237573 A | * | 11/2011 | |
| JP | 2012208236 A | | 10/2012 | |
| JP | 2013076893 A | | 4/2013 | |
| JP | WO 2013051656 A1 | * | 4/2013 | ........... G02B 6/3801 |
| JP | 2013117664 A | | 6/2013 | |
| WO | 9419714 A1 | | 9/1994 | |
| WO | 2011057811 A2 | | 5/2011 | |
| WO | 2011057812 A2 | | 5/2011 | |

* cited by examiner

OPTICAL COUPLER FOR A MULTICORE FIBER

CROSS-REFERENCE TO RELATED APPLICATION

This is a continuation application, under 35 U.S.C. §120, of copending international application No. PCT/EP2014/062430, filed Jun. 13, 2014, which designated the United States; this application also claims the priority, under 35 U.S.C. §119, of German patent application No. DE 10 2013 013 071.9, filed Aug. 6, 2013; the prior applications are herewith incorporated by reference in their entirety.

BACKGROUND OF THE INVENTION

Field of the Invention

The invention relates to an optical coupler for optically coupling a multicore fiber having a plurality of optical cores to a plurality of individual fibers.

Such an optical coupler is disclosed, for example, by U.S. patent publication No. 2011/0176776 A1.

In optical signal transmission, multicore fibers, in which a plurality of optical cores, i.e. cores that conduct light waves, are jointly integrated in a fiber are also used in addition to the normally used individual fibers. Frequently, there is a need to connect such multicore fibers to individual fibers, i.e. to fibers that each have only one single core that conducts light waves.

Such a coupler is furthermore disclosed, for example, by U.S. patent publication No. US 2013/0051729 A1. The coupler contains a support plate, on which individual optical waveguides are attached, adjoining each of which, at an end, there is an approximately prismatic mirror element. The mirror elements are disposed on the support plate, corresponding to a distribution pattern of the cores of the multicore fiber. The multicore fiber is connected by an end face, i.e. at right angles to the support plate, to the coupler. The individual cores of the multicore fiber are in alignment with the individual mirrors, such that the optical signals of the individual cores are in each case conducted into the waveguides applied to the support plate, via the mirrors, with a 90° deflection.

Known in the field of waveguide technology is the so-called planar optical waveguide technique, in which waveguides are introduced into the surface of planar supports. Optical components, so-called optical chips having integrated functionality, for example splitters, can thus be realized on the basis of the planar waveguide technique. Such optical components are disclosed by international patent disclosures WO 2011/057811 A2 and WO 2011/057812 A2. The optical components in this case consist of a planar support element, preferably of glass, into which light-wave conducting paths are integrated by appropriate processing. In particular, in this case the conducting path is produced by an ion diffusion process. The structuring of a conducting-path pattern in this case is preferably effected lithographically, in a manner known per se. For the purpose of connecting fibers to such an optical component, a plurality of fibers are embedded, parallel and adjacent to each other, in a connection support, preferably likewise of glass, in particular in so-called V-grooves, in order to ensure an exact alignment and positioning of the individual fibers. The connection support is then coupled to the optical component in an appropriate manner, for example by adhesive bonding or other bonding method, such that the waveguides are in alignment with the fibers of the connection support.

In principle, the planar waveguide technique exhibits a high optical quality, such that this waveguide technique is in principle suitable for optical components with high quality specifications. Owing to its fundamental principle, namely the structuring of waveguide paths on the surface of the support element, the individual waveguides are disposed within a flat plane. In order to connect a multicore fiber to such an optical component, according to planar waveguide technology, a 90° deflection, as described in U.S. patent publication No. 2013/0051729 A1, would be a possibility for connection. However, the 90° deflection associated with this is disadvantageous.

An optical coupler for connecting a multicore fiber is described in U.S. patent publication No. 2011/0176776 A1. The optical coupler in this case, in an embodiment variant, has a plurality of planar light-wave conductor elements, disposed parallel to each other and in layers, connected to each of which is a group of the cores of the multicore fiber. The individual groups in this case are parallel to each other, corresponding to the support elements. In order to increase a grid dimension between the individual cores of the multicore fiber in the connection region, the multicore fiber has been widened in its connection region.

Furthermore, published, Japanese patent application JP 2013-076893 A discloses an optical coupler in which a multilayer light-wave conductor element is connected to a multicore fiber. The optical connection pattern of the cores formed by the multicore fiber is transferred, by the multi-layer optical element, to a linear-type connection pattern for the individual cores. It is a prerequisite in this case that the individual cores of the multicore fiber be disposed at differing levels. Each individual core is routed, via a light-wave conductor structure extending in a respective layer, onto the line pattern disposed on the output side.

SUMMARY OF THE INVENTION

Proceeding therefrom, the invention is based on the object of specifying an optical coupler for coupling a multicore fiber, in particular by planar waveguide technology.

The object is achieved, according to the invention, by an optical coupler. The optical coupler in this case contains a support, in which a multicore fiber, having a plurality of optical cores extending in a longitudinal direction, is embedded. For this purpose it is provided, in particular, that the multicore fiber is inserted in a V-groove of the support and encapsulated therein. The individual cores lead into an end face of the support. The cores can be sub-divided into a plurality of groups of cores, the individual groups of cores being oriented along straight lines. Therefore at least two groups of cores of the multicore fiber are defined, which are oriented along a first line and along a second line. The coupler additionally has a first and a second coupling element, to which a first and a second group of individual fibers can be connected, or is connected. The coupling elements in this case each contain an optical support element, realized in the manner of planar waveguide technology, having waveguides inserted therein, the waveguides, in turn, extending along a line, on an end-face connection side. For the purpose of connecting the individual cores of the multicore fiber to the waveguides of the support elements, it is then provided that a plurality of support elements be jointly connected, by their connection sides, to the end face of the support. The cores of the first group of the multicore fiber are in alignment with the waveguides of the first support element, and the cores of the second group of the multicore fiber are in alignment with the waveguides of the second support element. As a result, during operation, optical signals from a respective core are injected into an associated waveguide of the respective support element.

Thus, at least two support elements are connected jointly to the end face of the support, each support element adjoining a group of cores that extends along a line. In this way, a multicore fiber can be connected to individual fibers in a simple manner, by use of planar waveguide technology. According to an expedient design, the waveguides are also accordingly inserted in the surface of the support element, in particular by use of an ion diffusion process, and preferably lithographically.

In principle in this case, an exact alignment of the multicore fiber in respect of a reference plane is of major importance, since an exact orientation of the lines of the multicore fiber with the respective surface of the support elements must be ensured. Accordingly, according to an expedient design, the multicore fiber is embedded within the support in such a manner that the individual cores are aligned exactly in relation to a reference plane. The reference plane in this case is preferably constituted by a lateral face of the support. The individual lines of the groups of cores are now expediently oriented parallel or at a defined angle thereto.

In general, therefore, the support is preferably of a planar design, having a rectangular cross-sectional face, the individual lines being parallel to a respective lateral face of the support. This measure provides for an orientation of the support, and of the multicore fiber in relation to the plurality of support elements, that is as exact as possible.

In general, this connection principle is suitable for two or more groups of cores that can be oriented along a line. In a preferred design, a further group of cores is defined, which is oriented along a further line and which can be connected, via a further optical coupling element, to a further group of individual fibers.

The lines of the individual groups of cores and, correspondingly, the support elements, are oriented at an angle, in particular at right angles, in relation to each other. Owing to the angled, in particular right-angled, orientation of the individual support elements in relation to each other, connection to the cores can be effected in a particularly suitable manner.

The individual support elements bear flatly against each other, in order to copy a distance dimension, predefined by the multicore fiber, and consequently the distribution pattern or connection pattern of the multicore fiber.

Accordingly, therefore, in the case of the second support element, in an expedient design, a waveguide is disposed in a corner region, an edge distance of the waveguide from the lateral face of the support element being less than or equal to a core distance between the first line of the groups of cores and the nearest core of the second line.

In order to avoid, insofar as possible, reflections in the transition from the support to the support element, the end face of the support and, corresponding thereto, the connection sides of the support elements are beveled. The entire connection side of the respective support element and preferably the entire end face therefore have an overall oblique orientation in respect of the surfaces of the support, or of the respective support element. The obliquity is oriented at an angle of inclination of preferably approximately 7 to 11 degrees in respect of a perpendicular orientation in relation to the surface.

In order to ensure an optical transition that is as good as possible, the end face of the support with the embedded multicore fiber is polished, such that the individual cores thus lie in a defined flat plane formed by the end face. In an expedient development, to enable the multicore fiber to be connected to standardized optical components such as optical connectors, etc., the waveguides of the support elements diverge from the connection side toward a coupling side, to which the individual fibers are connected, or can be connected. The distance dimension of the individual cores in the multicore fiber, which, for example, is only 30 μm, is therefore widened to a desired grid and distance dimension, for example in the order of magnitude of 127 μm, 250 μm or a multiple thereof.

In an expedient development, furthermore, adjoining the support element there is a connection support, in which the respective group of individual fibers is embedded, in particular in V-grooves. The coupling element therefore contains, besides the support element, also the connection support, which is optically coupled to the support element in an appropriate manner, in particular by adhesive bonding. The individual fibers are in alignment with the respective waveguide of the support element on the coupling side. For this purpose, the connection support, in turn, likewise has an associated, in particular polished, connection side.

In an expedient development, at the end opposite to the connection support the individual fibers are connected to an optical plug connector, via which further optical fibers can then be connected via conventional optical standard connectors. Accordingly, the individual fibers embedded in the connection support are also comparatively short, and extend, for example, only over a few centimeters, to enable one or more optical connectors to be coupled to the coupling element.

Other features which are considered as characteristic for the invention are set forth in the appended claims.

Although the invention is illustrated and described herein as embodied in a optical coupler for a multicore fiber, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

In the figures, parts that perform the same function are denoted by the same references.

Figure 1:
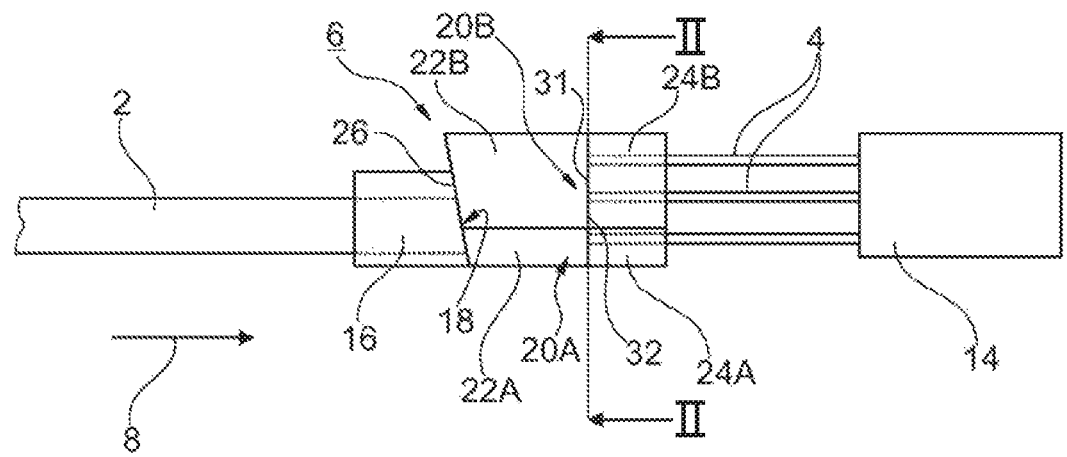
FIG. 1 is a diagrammatic, side view of an arrangement having an optical coupler for connecting a multicore fiber to a plurality of individual fibers according to the invention.

For the purpose of connecting an optical multicore fiber 2 to a plurality of individual fibers 4, an optical coupler 6 is realized, as represented in a simplified and general manner in FIG. 1, in a side view. Further details are given by the further figures.

The multicore fiber 2 extends in a longitudinal direction 8. The optical coupler 6 and the outgoing individual fibers 4 adjoin the multicore fiber 2 in the longitudinal direction 8.

Figure 2:
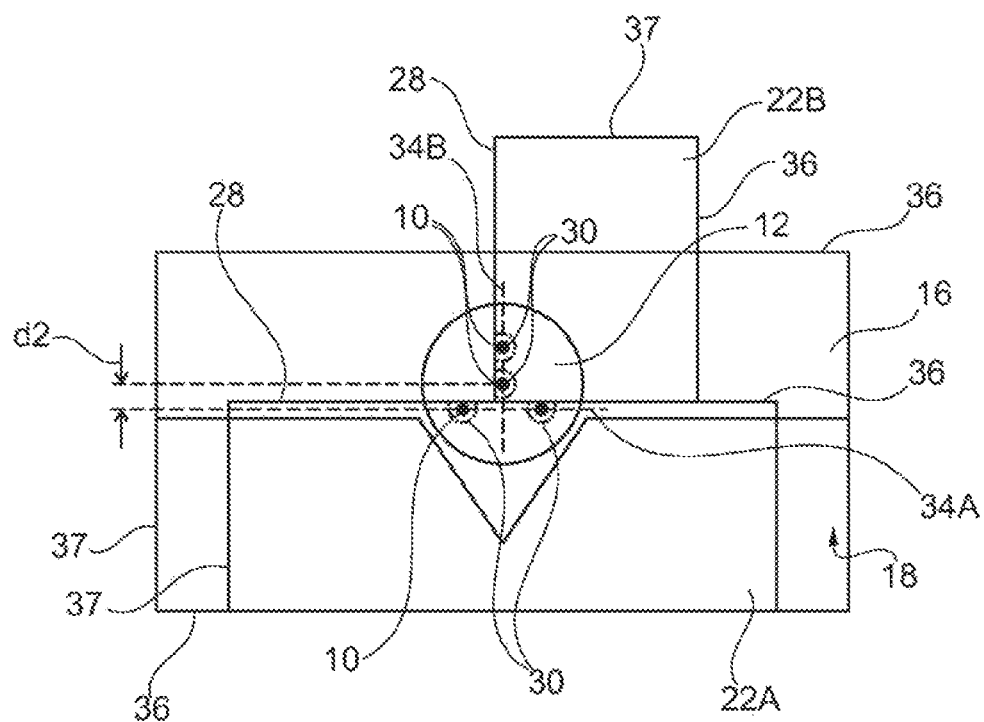
FIG. 2 is a sectional view taken along the line II-II shown in FIG. 1, of two optical coupling elements, which are connected to a support having the multicore fiber.
Figure 3A:
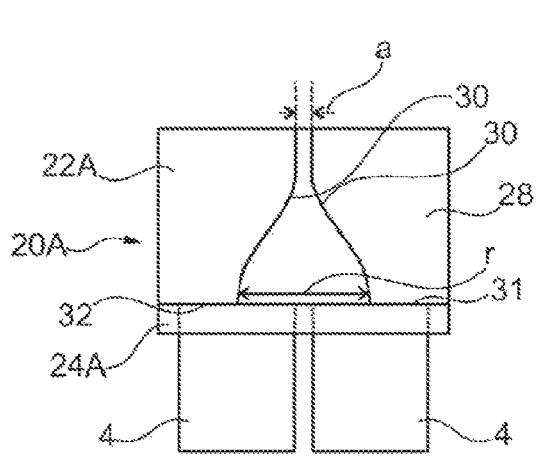
FIG. 3A is a top view of a first coupling element that is connected to the support according to FIG. 2.
Figure 3B:
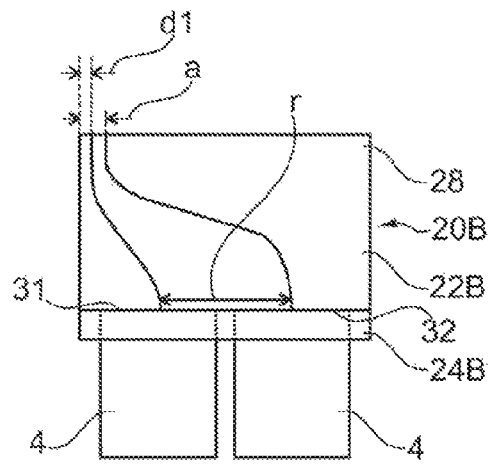
FIG. 3B is a top view of a second coupling element that is connected to the support according to FIG. 2.

The optical multicore fiber 2 has a plurality of optical cores 10, which are embedded in a fiber sheath 12 (for this, see, for example FIG. 2). By contrast, the individual fibers 4 have optical cores that are each individually embedded via in a fiber sheath (not represented).

In addition, in FIG. 1, connected to the individual fibers 4, at an end, there is also an optical plug connector 14, via which further individual fibers can be connected, via a standard plug connection. Accordingly, the multicore fiber 2 is preferably also connected to an optical plug connector, not represented in greater detail here. The arrangement as a whole in this case constitutes a prefabricated adapter assembly for changing from a multicore-fiber system to a single-fiber system via standard plug connectors.

Figure 6:
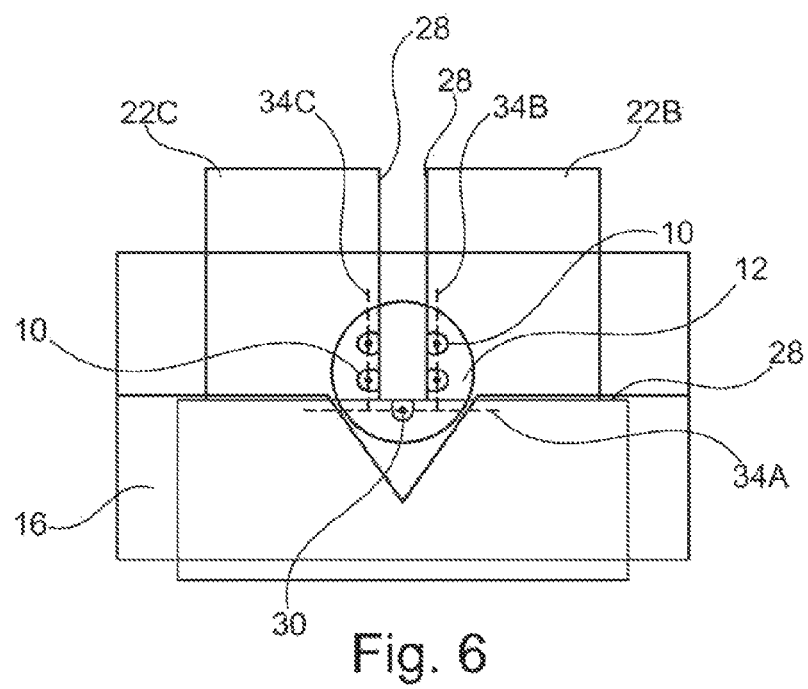
FIG. 6 is a sectional view comparable to FIG. 2, but with a total of three support elements connected to a support.
Figures 7A, 7B, 7C:
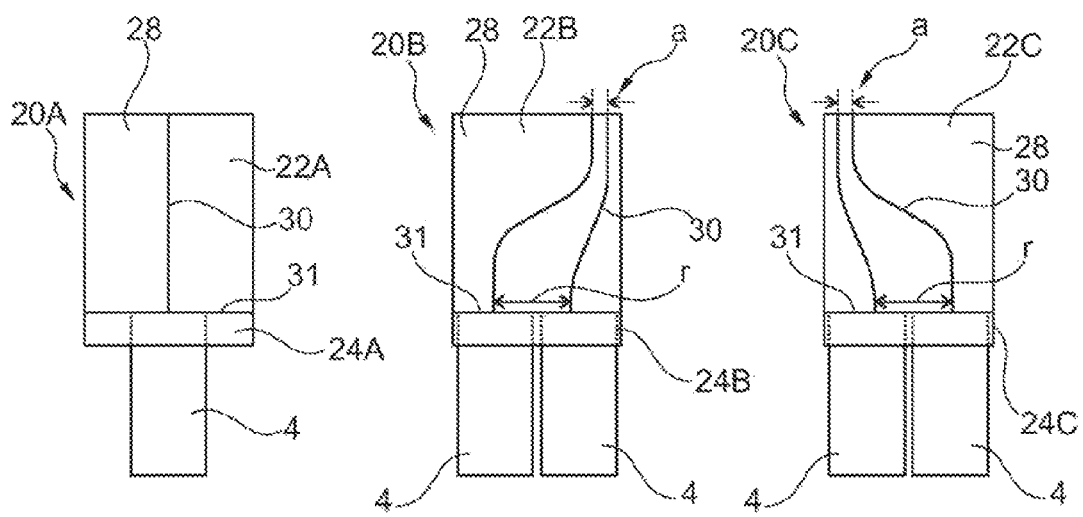
FIGS. 7A to 7C are top views of the coupling elements connected to the support.

The optical coupler 6 contains a support 16, in which the multicore fiber 2 is embedded. A plurality of coupling elements is connected to a beveled end face 18 of the support 16. In the exemplary embodiment of FIG. 2, there is a first coupling element 20A and a second coupling element 20B and, in the case of the embodiment variant according to FIG. 6, also an additional, third coupling element 20C, connected to the support 16.

In the exemplary embodiments, a respective coupling element 20A, B, C is in this case composed of a support element 22A, B, C and of a connection support 24A, B, C adjoining the latter. The support elements 22A, B, C are each realized as optical components, according to planar waveguide technology, and are also designated as so-called optical chips. The support elements 22A, B, C each bear, by an end-face connection side 26, on the end face 18 of the support 16. The support elements 22A, B, C are composed of a suitable optical support material such as, for example, glass or plastic, and are usually rectangular in cross section. They each have a surface 28, in each of which, respectively, at least one waveguide 30 is inserted (for this, see, in particular, FIGS. 3A, 3B and FIGS. 7A to 7C). A respective waveguide 30 in this case is in exact alignment with a respective core 10 of the multicore fiber 2. Coupled to the back side of the respective support element (26A, B, C) is the respective connection support 24A, B, C, in which—in a manner similar to that of the support 16—the individual fibers 4 are embedded. The latter likewise terminate at a polished, further end face 31, by which they are coupled to a coupling side 32 of the respective support element 22A, B, C. In this case, the individual cores 10 of the individual fibers 4, in turn, are in exact alignment with the waveguides 30 on the coupling side 32.

As shown, in particular, by FIG. 1, the individual elements adjoin each other in the longitudinal direction 8, the individual transitions between the cores 10 of the multicore fiber 2 toward the waveguides 30 of the support elements 22A, B, C therefore being in alignment in the longitudinal direction 8. The same applies to the following transitions between the waveguides 30 and the cores of the individual fibers 4.

Owing to the use of planar waveguide technology, in the case of the support elements 22A, B, C waveguides 30 are only available on the surface 28. This is due to the special production method, in which the waveguides 30 are inserted in the support substrate of the support element 22A, B, C, in particular by an ion diffusion process. A lithography method is preferably used in this case for the purpose of structuring the waveguide pattern. The waveguides 30 are therefore realized directly on the surface 28.

On the other hand, however, the cores 10 of the multicore fiber 2 are disposed in a distributed manner in a plane perpendicular to the longitudinal direction 8, as can be seen from FIGS. 2 and 7. The support elements 22A, B, C, with their waveguides 30 inserted in their surfaces 28, are generally disposed in such a manner that the individual cores 10 are in exact alignment with the waveguides 30 on the surface 28, this being in such a manner that, by appropriate groupings of the cores, all cores 10 are aligned along lines 34A, B, C, which are in plane-parallel alignment with a respective surface 28 of the support elements 22A, B, C.

In the exemplary embodiment of FIG. 2, the total of four cores 10 are oriented along a first line 34A, and along a second line 34B oriented perpendicularly thereto. Since an exact alignment must be effected in relation to the waveguides 30, the multicore fiber 2 is already aligned in a defined manner within the support 16. The support 16, like the support elements 22A, B, C, has a rectangular cross-sectional face with opposing base sides 36 and with opposing lateral faces 37. In the case of the support elements 22A, B, C, the surface 28 constitutes one of the base sides 36.

Figure 4A:
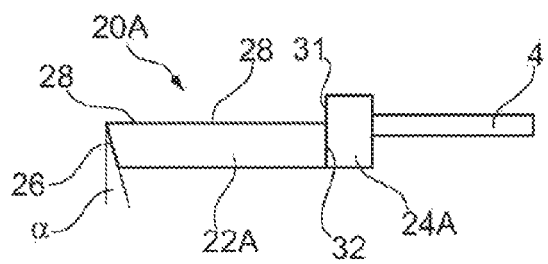
FIG. 4A is a side view of the first coupling element according to FIG. 3A.
Figure 4B:
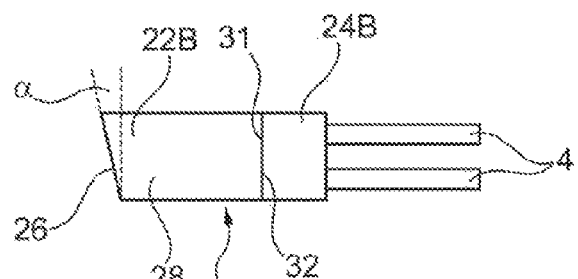
FIG. 4B is a side view of the second coupling element according to FIG. 3B.
Figure 5:
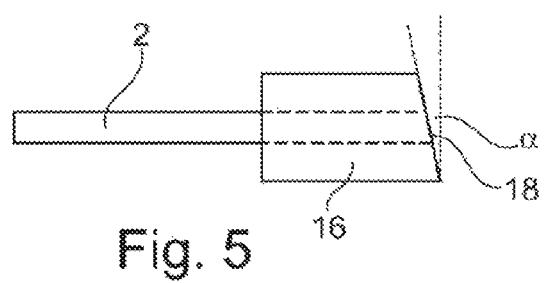
FIG. 5 is a side view of the support according to FIG. 2 with the multicore fiber embedded therein.

Preferably, the first line 34A is now parallel to the base sides 36, and the second line 34B perpendicular thereto. The support 16 preferably has two support halves 16A, 16B, the lower support half 16A in the initial state having a V-notch 38, in which the multicore fiber 2 is inserted. The multicore fiber 2 is adjusted and aligned already during the process of fixing the multicore fiber 2 to this lower support half 16A. Once the multicore fiber 2 is in the desired orientation, the multicore fiber 2 is fixed and embedded, such that the support 16, completely enclosing within it the multicore fiber 2, is realized. Then, in the final step, the beveled end face 18 is realized, in particular by polishing. This end face is inclined by an angle of inclination $\alpha$, for instance in the range of between 7 and 11 degrees, and preferably in the range of approximately 8 degrees, in respect of a vertical plane oriented perpendicularly in relation to the longitudinal direction 8 (for this, see FIGS. 4A, 4B and 5). As can be seen from FIGS. 4A, 4B, this angle of inclination $\alpha$ is also realized identically in the case of the support elements 22A, B, preferably likewise by a polishing process. As a result of this bevel, disturbing reflections are at least reduced.

In the same way as the support 16, the respective connection support 24A, B, C is preferably also realized with the embedded individual fibers 4. Here, also, the respective connection support 24A, B, C has a lower support half, which is provided with a V-groove, in which the respective individual fiber 4 is inserted at a defined position. The individual fibers 4 are likewise completely embedded in the volume of the respective connection support 24A, B, C.

For the purpose of exactly aligning the individual support elements 22A, B, C to the respective support 16, an optical signal is preferably fed into the individual optical signal paths, the alignment of the respective support element 22A, B, C in respect of the support 16 being affected until the signal strength is maximal. As soon as this exact aligned position is attained, the support element 22A, B, C is fastened at this position, in particular by means of an adhesive, on the support 16.

As can be seen, in particular, from FIGS. 2 and 7, the support elements 22A, B, C are oriented at an angle, in particular at right angles, in relation to each other, according to the alignment of the lines 34A, B, C of the individual groups of cores 10. The individual surfaces 28 are therefore oriented perpendicularly in relation to each other, according to the orientation of the lines 34A, B, C. The support elements 22A, B, C, aligned at an angle in relation to each other, in this case bear against each other with their planar sides.

In the case of the embodiment variant of FIG. 7, two lines 34B, C are realized, oriented parallel in relation to each other, each contains a group of cores. The support elements 22B, 22C oriented parallel to each other are spaced apart from each other, the distance being somewhat smaller than the distance between the parallel lines 34B, C.

The individual cores 10 are spaced apart from each other in the multicore fiber 2 by a distance dimension that, for example, is in the range of 30 μm. The total diameter of such a multicore fiber is, for example, 125 μm.

This comparatively slight distance dimension a of the individual cores 10 is widened, by means of the respective support element 22A, B, C and the waveguide structure applied thereon, to a defined grid dimension r on the coupling side 26. The grid dimension r is, for example, 127 μm, 250 μm or a multiple thereof. The waveguides 30 therefore diverge out from the connection side 26 toward the coupling side 32. At the coupling side 32, the respective waveguides 30 terminate preferably symmetrically and aligned in respect of a central longitudinal axis.

Conversely, at the connection side 26, in particular in the case of the vertically oriented support elements 22B, C, the waveguides 30 commence asymmetrically in a corner region. An edge distance d1 (see FIG. 3B) of the outermost waveguide 30 from the lateral face 37, with which the respective support element 22B, C lies on the horizontally extending support element 22A, is therefore very small and, for example, is only in the range of between 5 and 25 μm, preferably only in the range of 10 μm. This edge distance d1 is thus less than a core distance d2 between the first line 34A and the nearest core of the second or third line 34B, C (see FIG. 2).

The special design of the optical coupler 6 that is described here therefore creates a connection possibility for connecting a multicore fiber 2 to individual fibers 4 with the aid of planar waveguide technology. A prerequisite for this is that the cores 10 of the multicore fiber 2 can be grouped in such a manner that the cores 10 of each group extend exactly along a predefined line 34A, B, C. In this case, there is only a limited number of such groups available, since each group has its own assigned support element 22A, B, C. The number of groups, and thus of lines 34A, B, C, is therefore limited generally, in particular a maximum of three groups can be realized, to enable the support elements 22A, B, C to be manipulated.

The following is a summary list of reference numerals and the corresponding structure used in the above description of the invention:

2 optical multicore fiber
4 individual fiber
6 optical coupler
8 longitudinal direction
10 optical core
12 fiber sheath
14 optical plug connector
16 support
16A, B support halves
18 end face
20A first coupling element
20B second coupling element
20C third coupling element
22A first support element
22B second support element
22C third support element
24A first connection support
24B second connection support
24C third connection support
26 connection side
28 surface
30 waveguide
31 further end face
32 coupling side
34A first line
34B second line
34C third line
36 base side
37 lateral face
38 V-notch
α angle of inclination

The invention claimed is:

1. An optical coupler for optically coupling a multicore fiber having a plurality of optical cores to a plurality of individual fibers, the optical coupler comprising:
   a support in which the multicore fiber is embedded in a defined alignment and a first group of the optical cores is oriented along a first line and a second group of the optical cores is oriented along a second line, said support having an end face;
   support elements including a planar first support element to which a first group of the individual fibers can be connected and a second planar support element to which a second group of the individual fibers can be connected, each of said support elements having surfaces; and
   waveguides inserted into said surfaces of said support elements, a respective one of said support elements is directly attached, by a connection side, to said end face of said support, such that the optical cores of the first group of the multicore fiber are in alignment with said waveguides of said planar first support element, and the optical cores of the second group are in alignment with said waveguides of said planar second support element, and the first and second lines of the first and second groups of the optical cores and, corresponding thereto, said surfaces of said support elements, are disposed at an angle in relation to each other.

2. The optical coupler according to claim 1, wherein said surfaces of said support elements are disposed at a right angle in relationship to each other.

3. The optical coupler according to claim 1, wherein said support is of a planar design, having a rectangular cross-sectional face, and the first and second lines are parallel to a side of said support.

4. The optical coupler according to claim 1, wherein said support elements further include a planar third support element, wherein the multicore fiber has at least one third group of optical cores, which are oriented along at least one third line, and which can be connected to a third group of the individual fibers via said planar third support element.

5. The optical coupler according to claim 4, wherein the first, second and third lines are oriented perpendicularly in relation to each other.

6. The optical coupler according to claim 1, wherein in said planar second support element, at least one of said waveguides is disposed in a corner region, and an edge distance of said one waveguide from a lateral face of said planar second support element is less than or equal to a core distance of the first line from a nearest optical core of the second line.

7. The optical coupler according to claim 1, wherein said connection side and said end face are beveled so as to correspond to each other.

8. The optical coupler according to claim 1, wherein said end face is polished.

9. The optical coupler according to claim 1, wherein said waveguides of said support elements diverge from said connection side to an opposite coupling side, such that a distance dimension of the optical cores in the multicore fiber is increased to a grid dimension.

10. The optical coupler according to claim 1, further comprising connection supports, the first and second groups of the individual fibers are embedded in a respective one of said connection supports that is connected to a respective one of said support elements.

11. The optical coupler according to claim 1, further comprising an optical connector disposed at an end of the individual fibers.

* * * * *